United States Patent
Lin

(10) Patent No.: US 10,509,096 B2
(45) Date of Patent: Dec. 17, 2019

(54) LOCATION ERROR RADIUS DETERMINATION

(71) Applicant: Microsoft Technology Licensing, LLC, Redmond, WA (US)

(72) Inventor: Jyh-Han Lin, Mercer Island, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 548 days.

(21) Appl. No.: 14/274,226

(22) Filed: May 9, 2014

(65) Prior Publication Data

US 2015/0323646 A1 Nov. 12, 2015

(51) Int. Cl.
   *G01S 5/02* (2010.01)
   *G01S 5/14* (2006.01)

(52) U.S. Cl.
   CPC ........... *G01S 5/021* (2013.01); *G01S 5/02* (2013.01); *G01S 5/0236* (2013.01); *G01S 5/0252* (2013.01); *G01S 5/0278* (2013.01); *G01S 5/14* (2013.01)

(58) Field of Classification Search
   CPC . G01S 5/0252; G01S 5/14; G01S 5/02; G01S 5/0236; G01S 5/021; G01S 5/0278; H04W 64/00
   See application file for complete search history.

(56) References Cited

U.S. PATENT DOCUMENTS

| 7,835,749 B1 * | 11/2010 | Hart ................ H04W 36/385 342/450 |
| 7,956,807 B1 | 6/2011 | Celebi et al. |
| 8,279,840 B2 | 10/2012 | Walker, Sr. |
| 8,369,264 B2 | 2/2013 | Brachet et al. |

(Continued)

FOREIGN PATENT DOCUMENTS

| CN | 103080771 A | 5/2013 |
| CN | 103649683 A | 3/2014 |

(Continued)

OTHER PUBLICATIONS

"International Preliminary Report on Patentability Issued in PCT Application No. PCT/US2015/029335", dated Mar. 3, 2016, 6 Pages.

(Continued)

*Primary Examiner* — Cassi J Galt
(74) *Attorney, Agent, or Firm* — Ray Quinney & Nebeker, P.C.; Thomas M. Hardman; Matthew M. Walker

(57) ABSTRACT

A system and method determining an error radius reflecting the accuracy of a calculated position of a processing device is provided. A data structure includes an error radius mapped to a scaled geographic area or "tile" comprising an area in which a calculated position may be determined. The data structure may include a plurality of first fields identifying a scaled geographic area based on a global projection reference system, and a plurality of second fields identifying, for each of the first fields, a position error radius associated with (Continued)

a scaled geographic area and level. For any calculation of an inferred position based on beacon observations, a rapid lookup of the corresponding scaled area including the new inferred position in the data structure returns an error radius for the new inferred position.

14 Claims, 12 Drawing Sheets

(56) References Cited

U.S. PATENT DOCUMENTS

| | | | |
|---|---|---|---|
| 10,267,893 B2* | 4/2019 | Gonia | H04W 64/00 |
| 2002/0062193 A1 | 5/2002 | Lin | |
| 2004/0225436 A1 | 11/2004 | Yoshihashi | |
| 2007/0202887 A1* | 8/2007 | Counts | G01S 5/0252 |
| | | | 455/456.1 |
| 2008/0108371 A1 | 5/2008 | Alizadeh-shabdiz et al. | |
| 2009/0189810 A1 | 7/2009 | Murray | |
| 2010/0090899 A1 | 4/2010 | Zhao et al. | |
| 2010/0324813 A1* | 12/2010 | Sundararajan | G01C 21/20 |
| | | | 701/532 |
| 2011/0227791 A1 | 9/2011 | Lin et al. | |
| 2012/0177025 A1 | 7/2012 | Huang et al. | |
| 2012/0182933 A1 | 7/2012 | Bandhakavi et al. | |
| 2012/0303556 A1 | 11/2012 | Lin et al. | |
| 2013/0018826 A1 | 1/2013 | Sundararajan et al. | |
| 2013/0023282 A1 | 1/2013 | Lin et al. | |
| 2013/0342401 A1 | 12/2013 | Lin et al. | |
| 2014/0040175 A1 | 2/2014 | Sundararajan et al. | |
| 2014/0057651 A1 | 2/2014 | Lin et al. | |

FOREIGN PATENT DOCUMENTS

| | | |
|---|---|---|
| DE | 102007045684 A1 | 4/2009 |
| JP | 2004317442 A | 11/2004 |
| RU | 2488842 C1 | 7/2013 |

OTHER PUBLICATIONS

"International Search Report & Written Opinion Issued in PCT Application No. PCT/US2015/029335", dated Jul. 30, 2015, 11 Pages.
Sharp, et al.,"Positional Accuracy Measurement and Error Modeling for Mobile Tracking", In Proceedings of in IEEE Journals on Mobile Computing, Jun. 2012, 12 pages.
Chintalapudi, et al., "Indoor Localization Without the Pain", ACM, MobiCom'10, Sep. 20-24, 2010.
Demiroz, et al.,"Classification by Voting Feature Intervals", Lecture Notes in Computer Science vol. 1224, Apr. 1997, pp. 85-92.
Microsoft, "Bing Maps Tile System", downloaded May 2014 from: http://msdn.microsoft.com/en-us/library/bb259689.aspx.
Reyero, et al., "A Pervasive Indoor-Outdoor Positioning System", In the Journal of Networks, Nov. 2008, 14 pages.
Celebi, et al., "Adaptive Positioning Systems for Cognitive Radios", In the IEEE conference of New Frontiers in Dynamic Spectrum Access Networks, Apr. 17, 2007, 7 pages.
Yang, et al., "On the Performance of Wireless Indoor Localization Using Received Signal Strength", Chapter 12, Handbook of Position Location: Theory, Practice, and Advances, Institute of Electrical and Electronics Engineers, Inc, Sep. 6, 2011, http://www.winlab.rutgers.edu/~gruteser/papers/chap12.pdf.
PCT Demand and Response to Written Opinion filed Nov. 13, 2015 in PCT Application No. PCT/US2015/029335, 12 Pages.
"First Office Action Issued in Chinese Patent Application No. 201580024354.2", dated Jul. 3, 2018, 12 Pages.
"Office Action Issued in Mexican Patent Application No. MX/a/2016/014637", dated Apr. 26, 2018, 6 Pages.
"Notice of Allowance Issued in Russian Patent Application No. 2016143736", dated Dec. 11, 2018, 20 Pages.
"Office Action Issued in Australian Application No. 2015256160", dated Sep. 26, 2018, 2 Pages.
"Second Office Action Issued in Chinese Patent Application No. 201580024354.2", dated Mar. 6, 2019, 6 Pages.
"Office Action Issued in Japanese Patent Application No. 2016-565379", dated Mar. 19 , 2019, 13 Pages.

* cited by examiner

Step 330

LOCATION ERROR RADIUS DETERMINATION

BACKGROUND

Location estimation is used by mobile processing devices to establish the device location and is a feature used by a number of applications on the device. Generally, location estimation techniques may use a number of different data sources to calculate a position. Wi-Fi positioning systems can provide location information when such devices are indoors using the availability of wireless access points. The accuracy of such approaches depends on the number of positions that are known to the positioning algorithm. The possible signal fluctuations that may occur, however, can increase errors and inaccuracies in the path of the user. Typically, an error radius is determined for a calculated position which reflects the accuracy of the determination. In some applications, such as mapping applications, an error radius is displayed around a calculated position.

SUMMARY

Technology is provided for determining an error radius reflecting the accuracy of an inferred (or calculated) position of a processing device is provided. A data structure includes an error radius mapped to a scaled geographic area or "tile" comprising an area in which an inferred position may be determined. For any calculation of an inferred position based on beacon observations, a rapid lookup of the corresponding scaled area including the new inferred position in the data structure returns an error radius for the new inferred position.

The data structure may include a plurality of first fields identifying a scaled geographic area based on a global projection reference system, and a plurality of second fields identifying, for each of the first fields, a position error radius associated with a scaled geographic area and level. Each position error radius is calculated to be a maximum error radius for at least a threshold percentage of inferred positions in the associated scaled geographic area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology is provided for determining an error radius reflecting the accuracy of an inferred (or calculated) position of a processing device is provided. A data structure is provided which includes an error radius mapped to a scaled geographic area or "tile" comprising an area in which an inferred position may be determined. Each error radius in the data structure has been calculated to be accurate over a threshold percentage of correlated inferred positions. Each error radius—scaled geographic area association results from a correlation between errors in inferred positions determined for two sets of data (a training dataset and a test dataset) based on beacon observations of a given location, and relative to ground truth data for the location. A threshold percentage error for the correlation is established, and scaled areas meeting the threshold are included in the data structure. For any subsequent calculation of an inferred position based on new observations is made, a rapid lookup of the corresponding scaled area in the data structure returns an error radius for the inferred position. The error radius can be used to provide feedback to a user of a location-aware application on a processing device. The technology may be performed entirely on a mobile processing device, on a computing system coupled to a mobile device via a network, or split between the mobile device and a network-connected computing system.

Figure 1:
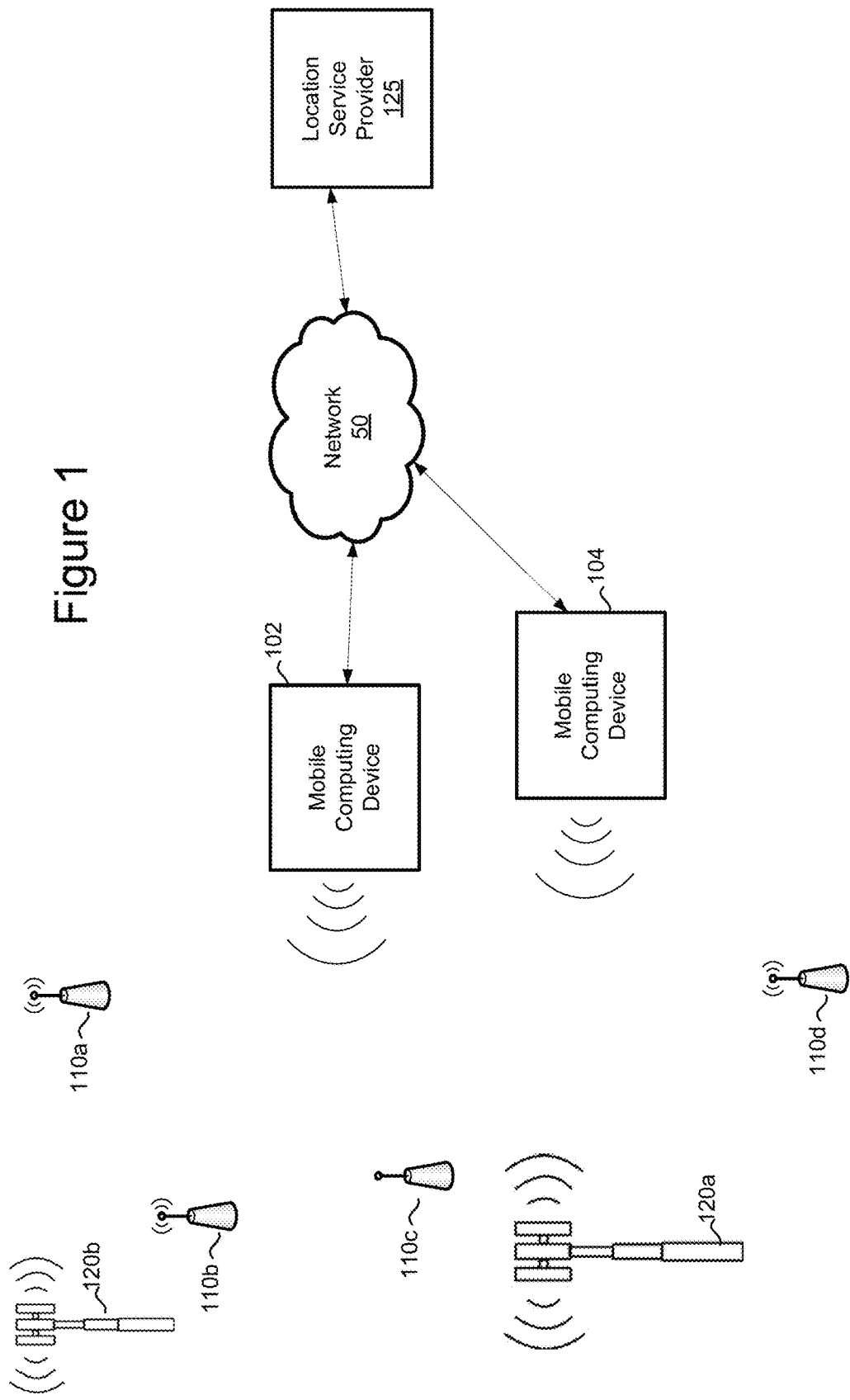
FIG. 1 is a block diagram depicting mobile computing devices relative to wireless beacons utilized for position calculations.

In the context of this disclosure, an inferred position may include a latitude, longitude and other logical location information such as a venue identifier, a store identifier and a floor identifier within the venue. FIG. 1 illustrates a block diagram of a plurality of mobile computing devices 102, 104 which utilize one or more beacons 110a-110d or other cell sites 120a, 120b to calculate a position for the mobile device. The mobile computing devices 102, 104 observe or otherwise detect one or more of the beacons 110, 120 and utilize the signals from these beacons to compute a position. Exemplary beacons include cellular towers, base stations, base transceiver stations, base station sites, and/or any other network elements supporting any quantity and type of vacation mode. Typically, beacons 110a-110d represent wireless fidelity (Wi-Fi) beacons which have known propagation properties and signals which provide information to allow the mobile devices to calculate positions in areas where other types of signals may not be present, such as the interior of buildings and the like. Each of the mobile computing devices 102, 104, may store properties for each observed beacon 110, 120. In some embodiments, exemplary properties include a latitude and longitude of the observing mobile computing device and an observation time. In internal locations such as a venue, the observations may include more granular information, such as a floor location.

Each mobile computing device may itself perform a position calculation, or may connect to a location service provider 125 via a network 50. Each mobile device may apply a Kalman filter (or other methods) to a beacon fingerprint (e.g., set of beacons observed by the computing device) to produce an inferred device position. The device error radius is retrieved from the data structure discussed herein. The error radius may be reflected as a circle having the estimated device error radius as its radius. As a result, if a particular beacon is detected with a given confidence level, an inferred device position may be produced that is within a circle centered at the estimated beacon position with the estimated beacon radius as illustrated at 418 of FIG. 4.

The location service provider 125 which may perform a location calculation based on the observations of mobile computing device (102, 104), pervious location surveys, and other data which is gathered and stored at the location service provider 125. In some embodiments, location service provider 125 may collect data from numerous different mobile computing devices as well as scheduled observations of beacons relative to known actual positions, referred to herein as ground truth. Mobile computing devices 102, 104 may send the properties of observed positions and of the beacons observed at the various locations to the location service via network 50. Location service provider 125 may operate one or more computing devices as illustrated herein to provide location determination services to the mobile processing devices via network 50.

A calculated or inferred position may include both position and have an associated error radius. The error radius is a reflection of the uncertainty or error which may be present in the calculation of the position. An illustration of an error radius as displayed by a mapping application using a calculated position is set forth in FIG. 4. Generally the error radius represents an area surrounding the calculated position which indicates to the user of the calculated position the relative accuracy of the calculation.

The observations may be used in conjunction with Global Position Systems (GPS) services to determine a position. In some instances, GPS data is not available. GPS is a satellite navigation system that uses more than two dozen GPS satellites that orbit the Earth and transmit radio signals which are received by and allow GPS receivers to determine their own location, speed, and direction. Thus, the GPS satellites transmit signals to GPS receivers on the ground, and the GPS receivers passively receive these satellite signals and process them (but generally do not transmit any signals of their own). However, when a mobile computing device is present an interior of a building venue, access to GPS data is generally difficult to receive. Hence, the use of WiFi or other information may yield more accurate inferred position data.

Figure 2:
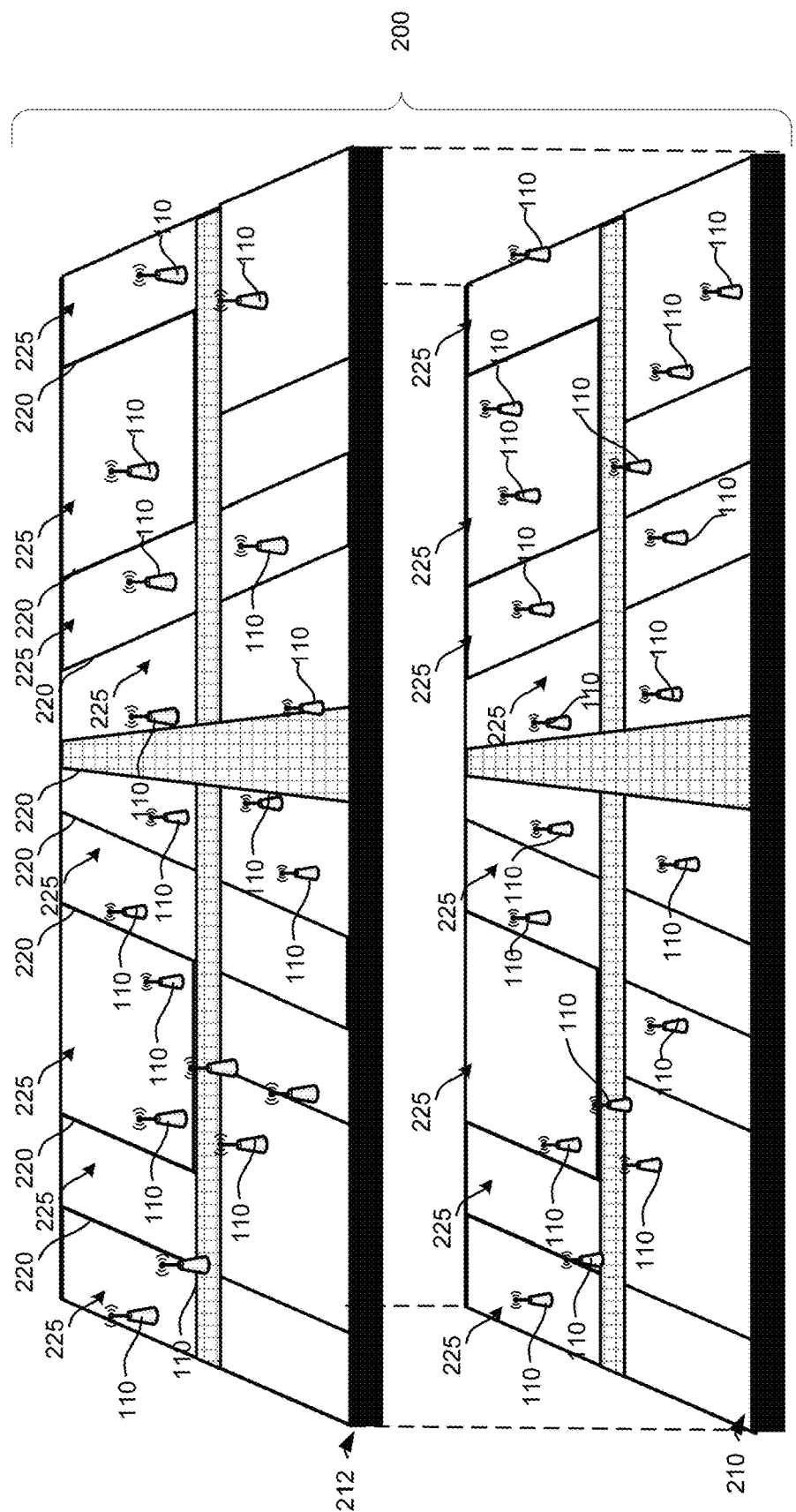
FIG. 2 is a perspective exploded view of an indoor location with a plurality of wireless beacons.

FIG. 2 illustrates an exploded, perspective view of a venue 200 having a plurality of Wi-Fi beacons positioned about the interior of the structure. Venue 200 may be, for example, a shopping mall, school, office building, airport or other building where access to GPS data is not readily available. FIG. 2 illustrates a first floor 210 and second floor to 212 of the venue 200. A plurality of walls 220 separate various rooms 225 within the venue 200. Beacons 110 are positioned throughout both floors of the structure 200. A processing device may use the properties of the beacons within the venue 200 to calculate the position of the processing device. Generally, calculated positions are returned to applications which utilize the calculated position to provide information to user. Although there are a number of different types of location applications, a mapping application is a an example which typically uses a calculated position.

Local positioning is done utilizing many different properties. Some use physical properties of the signal, while others use the time taken for the signal to reach the destination node. Some common positioning methods include Angle of Arrival, Cell Identity, Time of Arrival, Time Difference of arrival and power based wireless positioning methods. One common approach employs surveying of signal strength information in a particular area. This information forms a database describing the signal strength finger print of that area. The database is later used to determine the location of a mobile device by a particular pattern matching algorithm. Another power based wireless positioning approach uses a path-loss model to estimate the relationship between the signal strength and distance from transmitters. The estimated distances from three or more transmitters are used to trilaterate the final position of the device. Any of the aforementioned methods may be utilized in accordance with the present technology.

Figure 3:
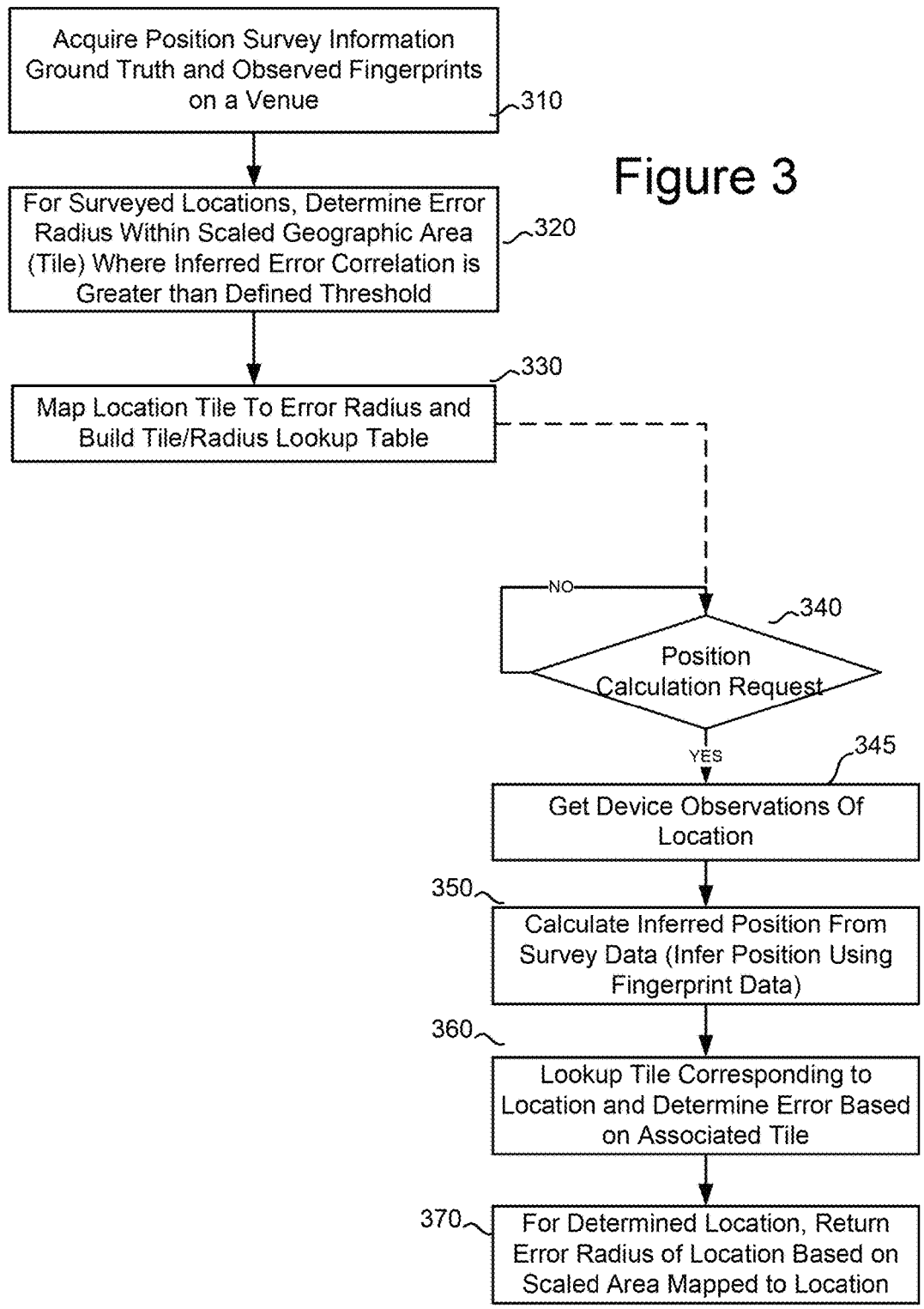
FIG. 3 is a flowchart representing a method in accordance with the present technology to determine a position and error radius.

FIG. 3 is a flowchart illustrating a method in accordance with the present technology to determine an error radius associated with a calculated or inferred position of a mobile processing device. The method may be performed in whole or in part on a mobile processing device alone, or in communication and cooperation with a location service 125. At step 310, position survey information is acquired for one or more physical facilities. The position survey information may comprise beacon fingerprints of locations of beacons which are detected at facilities. Beacons detected by a mobile computing device 102, 104 at a given point in time represent position observations and include a beacon fingerprint. The beacon fingerprint may also include other attributes of the detection such as signal strength, date and time of observation, etc. The facilities need not be indoor facilities, and may be locations where a plurality of beacons are present. One mechanism for gathering site information is disclosed in U.S. Patent Application Serial No. US20140057651A1.

Generally, position survey information may be gathered by physically surveying a site using a mobile processing device, determining a beacon fingerprint for the location and establishing a set of ground truth data of actual locations associated with beacon fingerprints for the venue. To establish ground truth for a particular venue, observed data for a venue is associated with known positions for the observed data. The observed data may be associated by means of a survey using known position information (in terms of known latitude, longitude, and floor positions) which is mapped to a beacon fingerprint at a given time. Fingerprints of the known beacons at each of a set of map locations is created.

The ground truth and observations are used, as discussed below, to calculate inferred positions to determine an error distance between the inferred position and the known position for multiple data sets. A correlation between the inferred errors at various levels of scaled geographic areas is used assess the accuracy of the error radius at inferred positions and assign the error radius to each of a particular set of scale geographic areas a global projection reference system.

At step 320, for any of the surveyed locations, error statistics are used to determine an error radius achieving a greater than threshold correlation between calculated or inferred positions within a scaled geographic area. Those scaled geographic areas within which error statistics indicate an error radius is likely to be accurate above a selected correlation threshold are associated with an error radius in a data structure at 330. It should be understood that steps 320 and 330 can be performed on a mobile processing device, or by the location service provider on one or more processing devices. A method of determining the areas within a predefined scale geographic area is discussed with respect to FIG. 6.

Once the data structure is created at 330, the data structure can be stored on a mobile computing device 102, 104, and/or maintained in a location service 124. This allows each mobile computing device seeking to infer a position and associated error radius to retrieve an accurate error radius rapidly with reference to the data structure in real-time on the device.

At any point after creation of the data structure at 330, at step 340 the location determination request is received. The request may be received by the location service or the mobile processing device. At 345, positions observations (fingerprints) of a location of a device originating the request at 340 are retrieved. At step 350, an inferred position is calculated from the position observations made by a requesting device. In accordance with the particular algorithm utilized for location determination calculation, at step 350, an inferred position is calculated for the requesting device.

Once the inferred position is calculated, at 360, a lookup of the corresponding scaled geographic area in the data structure matching the inferred location position determines the error radius associated with the scaled geographic area. At 370, for the determined inferred location, the error radius associated with the location is returned based on scale geographic area.

Figure 4:
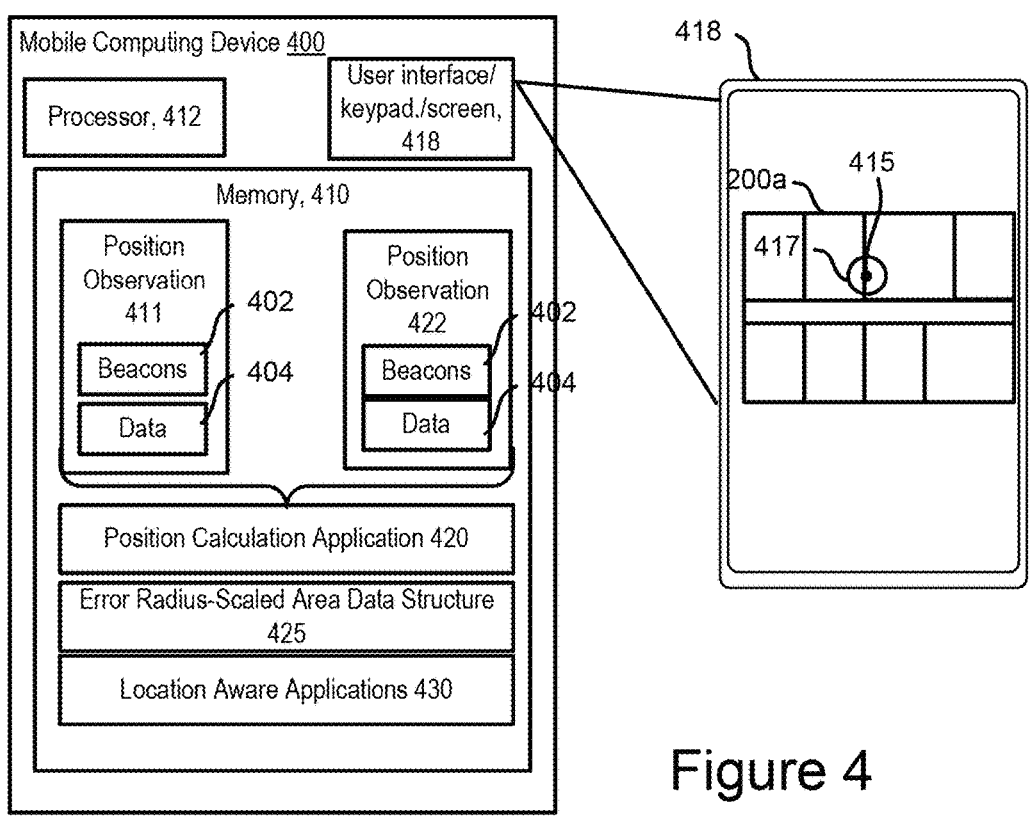
FIG. 4 is a block diagram of a functional representation of a first processing device and a computing device.

FIG. 4 illustrates a block diagram of a mobile computing device 400 which may comprise one of the mobile processing device 102, 104 of FIG. 1, and may include elements of a mobile device such that illustrated in FIG. 10, below. Computing device 400 may include, for example, a processor 412 and a user interface 418. An exploded view of a display of a user interface 418 illustrates a plan view of a map 200a of a venue, such as venue 200, with an indication 415 of an inferred position displayed on the map along with an error radius 417 surrounding the indication 415 of the inferred location.

Device 400 includes memory 410 which may store plurality of position observations 411, 422. Although only two position observations 411 and 422 are indicated, it will be understood that a number of position observations will be present in memory 410. Each position observation includes a fingerprint of beacons 402 and associated beacon data 404. The position observations may be utilized by a position calculation application 420. The position calculation application 420 may be utilized to calculate an inferred position from the position observations 411, 422. The position calculation application 420 may utilize the error radius-scaled area data structure 425 to assign an error radius to an inferred location calculated by the position calculation application. Location aware applications 430 utilize the inferred position calculated by the position of calculation application for any of a number of purposes. In one embodiment (illustrated in FIG. 4), the location aware application may be a map application and display the infer position along with the error radius on a user interface. It will be understood that numerous other types of applications make use of inferred locations, and the technology discussed herein is not limited to location aware applications which are mapping applications.

Figure 5:
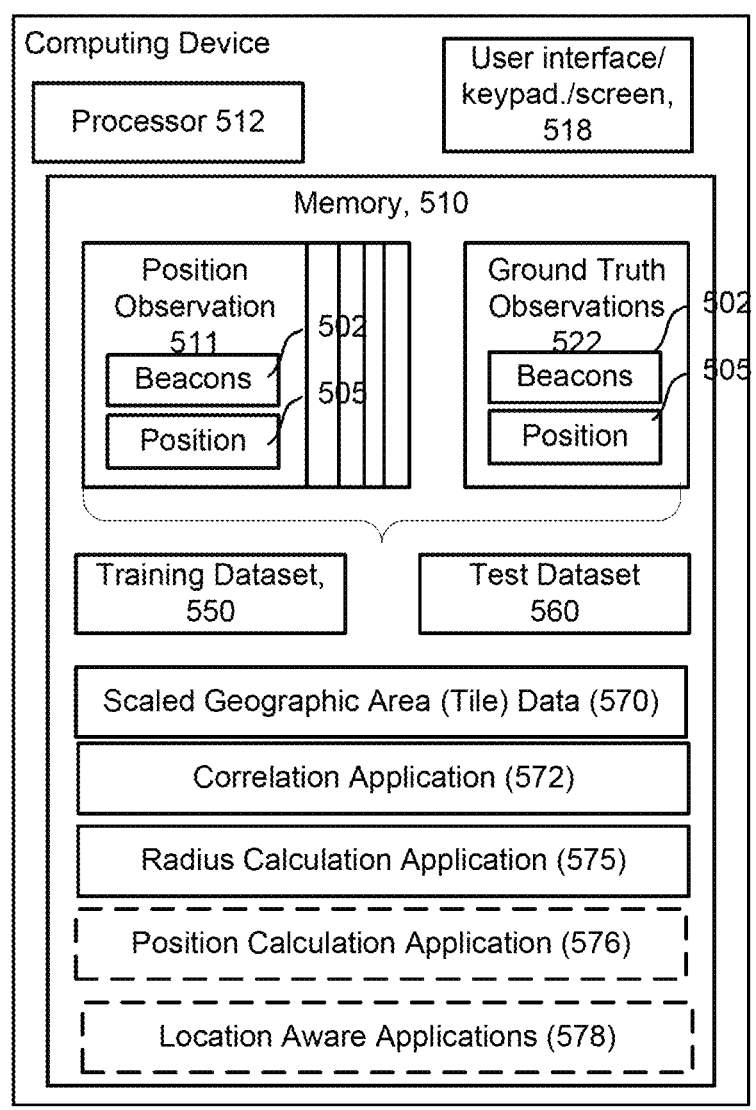
FIG. 5 is a block diagram of a functional representation of a second processing device and a computing device.

FIG. 5 illustrates a block diagram of the functional components of a computing device 500 which in one embodiment may perform the steps illustrated in FIG. 3. Computing device 500 includes a processor 512 and user interface 518. Device 500 may further include memory 510 having components provided therein including observed positions 511 and ground truth observations 522. As noted above, ground truth observations may include, for a set of positions at a known position latitude, longitude, and floor) a set of fingerprints of known beacons observed at the known position. As described below with respect to FIG. 6, this information can be utilized in conjunction with position observations to determine an error radius, which is mapped to a scale geographic area. In performing the method of FIG. 6, the set of position observations 520 is split into a training data set 550 and test data set 560. Memory 510 may further include scaled geographic area data 570, a correlation application 580, a radius calculation application 575, and may optionally include position calculation application 576 and location aware applications 578. One example of a global projection reference system using scaled geographic area is the Bing Maps Tile system. The tiles used therein may comprise scaled geographic area data. A scaled geographic area illustrated and described with respect to FIG. 8A. Position calculation application 576 operates in a manner similar to that shown in FIG. 4. Location aware applications 578 may be similar to those applications described above with respect to FIG. 4.

Figure 6:
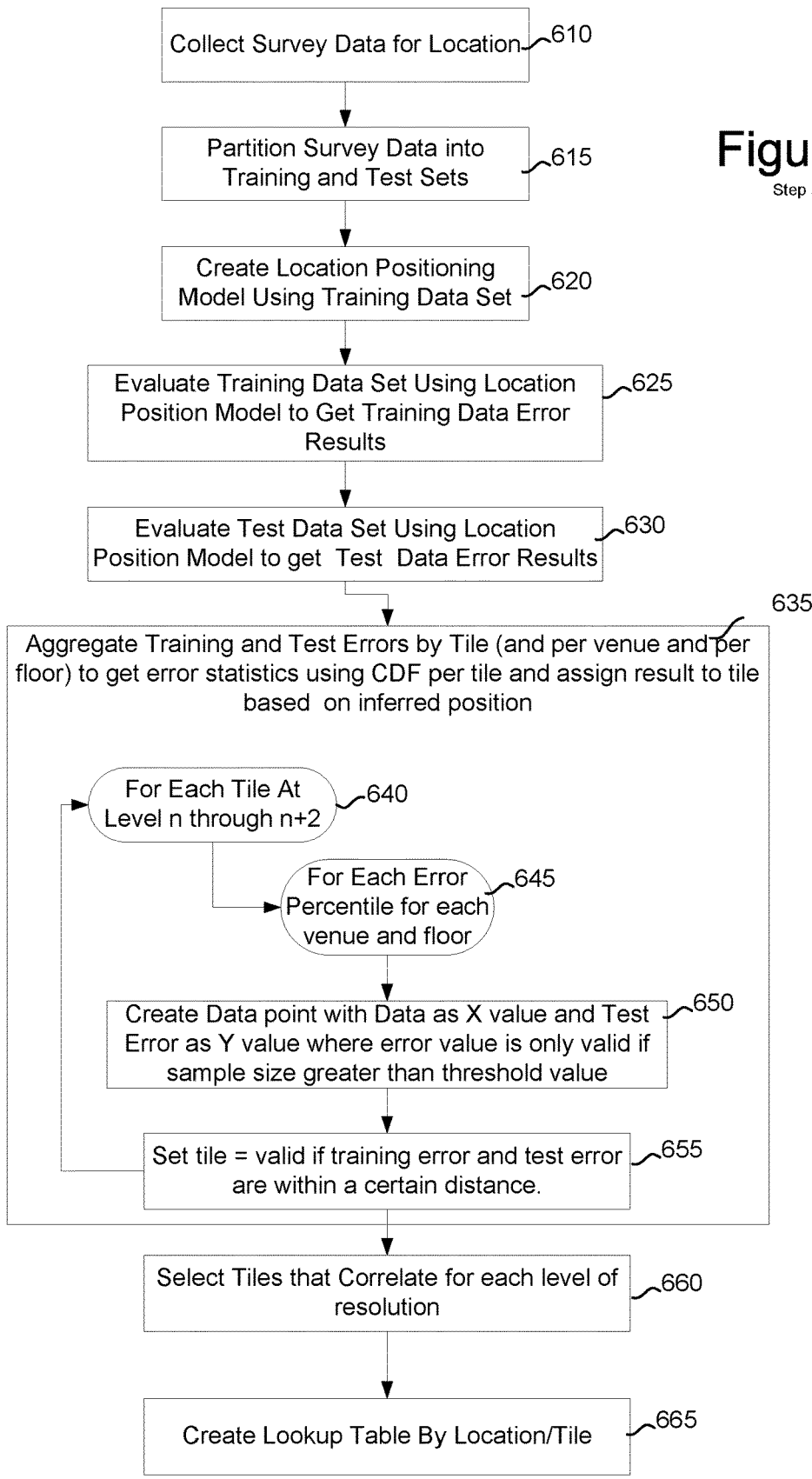
FIG. 6 is a flowchart representing a method of populating a data structure for use in determining an error radius in accordance with the present technology.

FIG. 6 illustrates a method in accordance with the present technology for performing step 330 in FIG. 3 of determining an error associated with scaled geographic areas which have an inferred error correlation is greater than a defined threshold in order to create an error radius-to-tile a data structure. At step 610, survey data for a location is collected. The survey data will be set of observations from which an inferred position can be calculated. The survey data is distinct from the ground truth data for the location. This allows error radius to be correlated with scaled geographic areas to be based on inferred positions, not true positions, since the true position is unknown in practice when a real-time request for a position determination is made (as in step 340 of FIG. 3).

At 615, the survey data is partitioned into a training data set and a test data set. The training dataset includes training position observations while the test dataset includes test position observations. In some embodiments, the training dataset is used to construct a location model while the test dataset and the location model are used to generate inferred locations which are tested against the training data. Inferred position calculations may be derived from each of the training and test data sets, the error between each data set inferred position and the ground truth calculated, and a correlation between the two errors used to determine whether that calculation is sufficiently accurate to rely on the calculation in error radius for a particular scaled geographic area.

At 620, a location position model is created using the training dataset. Creation of the location positioning model is the creation of the particular calculation which will be used to infer position from the position observations. Any of a number of different types of position calculations may be utilized, including use of a pattern matching algorithm, trilateration, or the method described in K. Chintalapudi and V. Padmanabhan, "Indoor Localization Without the Pain," MOBICOM, Association for Computing Machinery, Inc., September 2010.

At 625, the training data set is evaluated using the location position model selected at 620 to determine a training data error result. The evaluation at step 625 may include, for a set of observations in the training dataset, determining positions and distance errors for the positions relative to the ground truth data. At 630, and a manner similar to step 625, the test data set is evaluated using the location position model to return test data error results.

At 635, the training errors and test errors are aggregated by skill geographic area (tile) and per venue and per floor to retrieve error statistics using a cumulative distribution function (CDF) for each scaled geographic area (i.e. per tile) and assign an error result to each scaled geographic area based on the inferred position calculated for each. The scaled area that the error result belongs to is therefore based on an inferred position, rather than a true position. FIG. 9C is graph of a cumulative distribution function for a scaled geographic area. The X axis value comprises an error distance while the y-axis value is the percentage error.

Figures 8A, 8B:
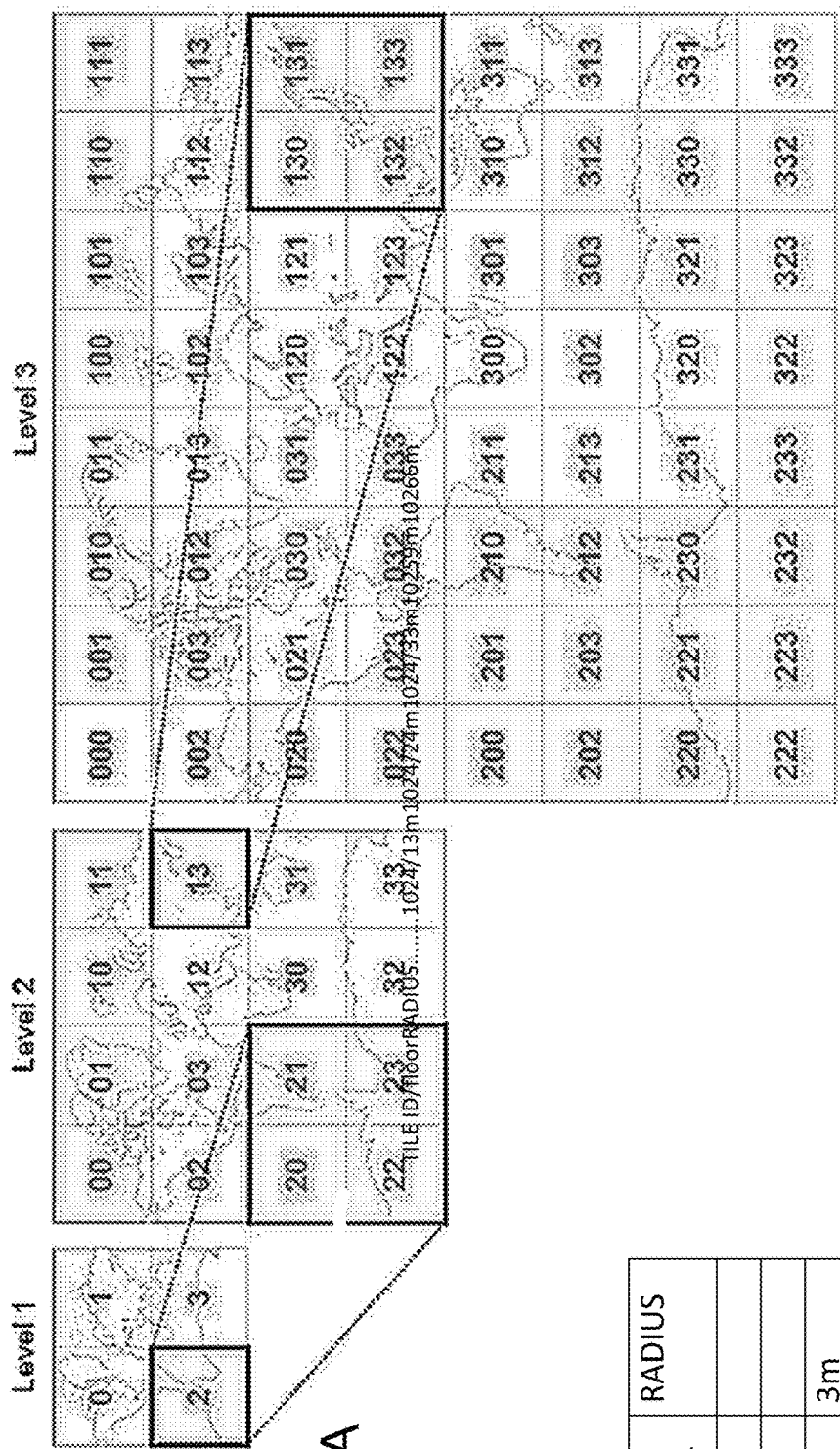
FIG. 8A is a depiction of a global projection reference system with scaled geographic areas of various levels.
FIG. 8B is a depiction of a data structure.

FIG. 8A illustrates 3 levels of a scaled geographic area suitable for use herein. The scaled geographic areas and projection system used in this example is the Bing Maps Tile System. As illustrated in FIG. 8A, each scaled area or tile layer consists of a set of uniformly-sized tile files (256 by 256 pixels). Each of these tiles is aligned on a fixed global grid in a Spherical Web Mercator projection. Each tile is an image or map of the ground at a predetermined, fixed zoom level. Thus every pixel in every tile at any zoom level represents a single fixed ground location. The number of tiles in the tile set (and its stored size) depend upon the size of the area depicted, the resolution of the source imagery or map, and the number of zoom levels created for viewing the tile set. Bing Maps uses a numbered sequence of zoom levels as shown in the illustration of FIG. 8A. The least-detailed zoom level is level 1, which represents the entire globe with a 2 by 2 grid of tiles. The common corner of these four tiles is located at 0 degrees longitude and 0 degrees latitude. Each integer increase in zoom level doubles the number of tiles in both the north-south and east-west directions. Zoom level 2 covers the globe with a 4 by 4 grid of tiles, level 3 with an 8 by 8 grid, and so on. Because the tile size is fixed, each increase in zoom level also reduces the size of the area on the ground represented by one pixel in a tile by a factor of 2, providing increasing visual detail in the tile set at higher zoom levels.

Assigning test errors to scaled geographic areas may be performed by, at step 640, for each tile at a number of selected levels in the projection system (three levels in this example), and at 645, for a set of error percentiles for each venue and floor, a graph of data points is created where, for each point, the training error data is used as the X value and the test error as the Y value at 650. In one embodiment, only data points greater than a defined sample size for both the training and the test errors—for example 30 samples—are considered valid.

Figure 9A:
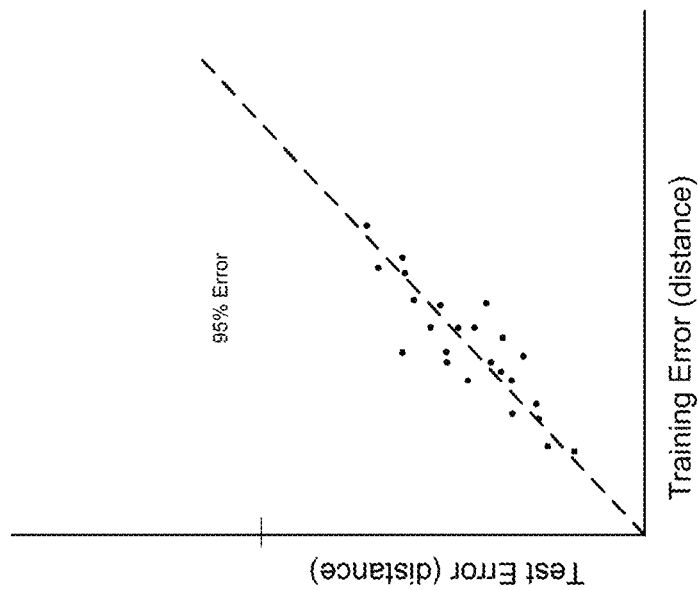
FIG. 9A is a graph of a correlation between calculated inferred positions based on two datasets.
Figure 9C:
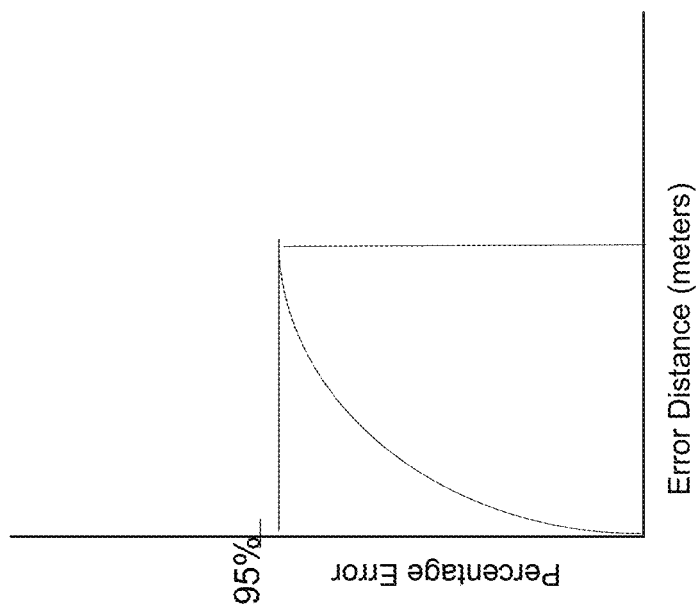
FIG. 9C is a depiction a cumulative distribution function (CDF) function relative to a calculated error radius.
Figure 9B:
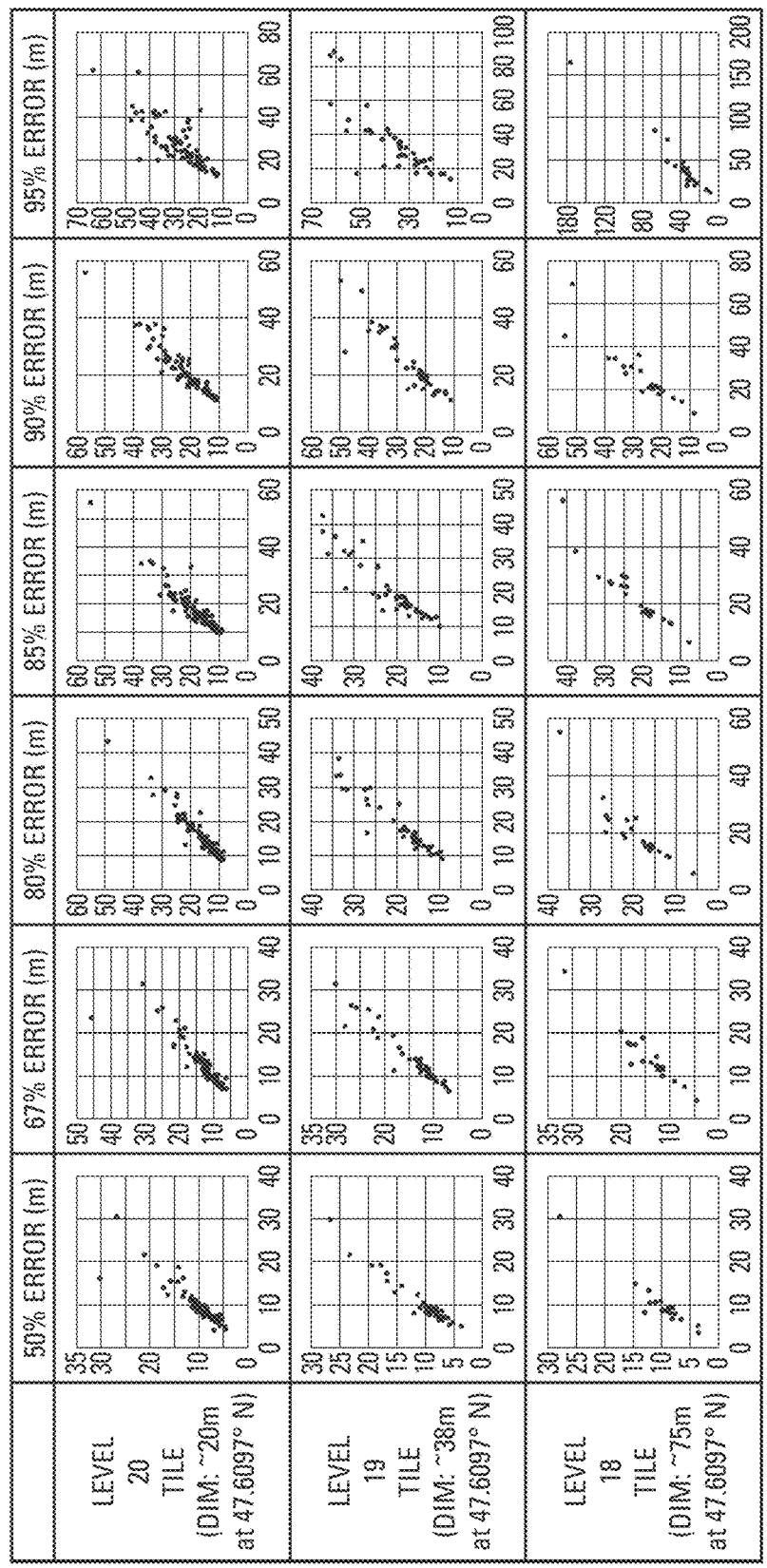
FIG. 9B is a depiction of the correlations for a set of scaled geographic areas in a tile.

This graphing is illustrated in FIGS. 9A and 9B. FIG. 9A is an enlarged view of a graph for a 95% error tile. FIG. 9B illustrates error statistics for levels 18, 19 and 20 of a scaled projection system, relative to a venue, for percentage errors of 50%, 67%, 80%, 85%, 90% and 95%. As illustrated in FIG. 9A, the error data as the X value and the test error as the Y value, a perfect correlation between test errors would result in a line of datapoints having a slope of 1. However, as illustrated in FIGS. 9A and 9B, the datapoints at lower (lower resolution) levels and at lower error percentages will approach this distribution. In the plots shown in FIG. 9B, the scaled areas (tiles) of level 19 at 95% error may be acceptable At 655, a scaled geographic area is selected for use if the training error in the test error are within a certain distance. For example, a scaled geographic area is said to meet correlation requirement if training error and test error are sufficiently close, for example within 5 or 10 meters. The selection occurs from the highest level of resolution (level 20 in the examples) to the lowest (level 18 in the example).

At 660, scaled geographic areas are selected for each level of resolution and for each venue, floor, and tile, the tiles that do correlate are selected (and those that do not are skipped) to be included in the error radius data structure. The error model for a venue consists of <floor-tile, 95% error>key-value pairs and floor level 95% errors. FIG. 9C represents a graph of the percentage error relative to the error distance determined for a particular tile. In this example, 95% of the inferred positions will have an error smaller than a given radius distance.

At 665, the scaled geographic areas are mapped to the error distance in a data structure such as that illustrated in FIG. 8B. In one embodiment, the data structure is provided to a mobile processing device to determine the error radius locally on the device in conjunction with map tiles used in the position of interest to the mobile device. Step 665 is equivalent to step 330 in FIG. 3.

It should be recognized in the foregoing example that various parameters may be altered without departing from the present technology. For example, while tiles having a 95% error are used in the foregoing example, different error levels will be used.

Figure 7:
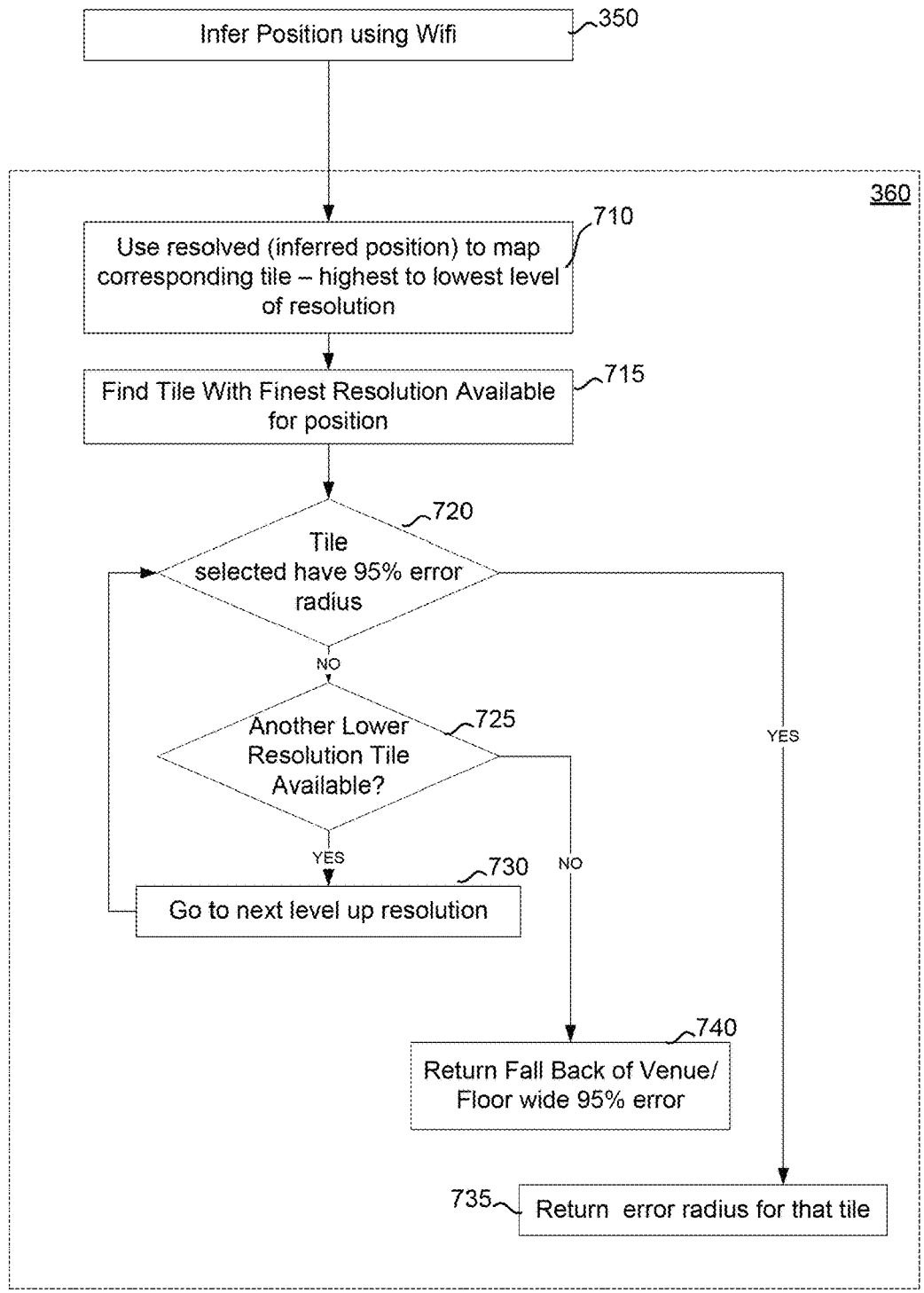
FIG. 7 is a flowchart illustrating a step in FIG. 3 of determining an error radius.

FIG. 7 illustrates a method for performing step 360 of FIG. 3 to look-up a scaled geographic area corresponding to a determined location and return a corresponding error distance. In the example shown in FIG. 7, and in one embodiment of the technology, the positioning system may utilize the scaled geographic areas to return mapping data for a location aware application. In such cases, a tile corresponding to the inferred position will be known from the inferred position. As illustrated in FIG. 3, at step 350, the mobile processing device position is inferred using the survey data and beacons detected. Next, at step 360, a calculation of the error radius is made by first, at 710, using the inferred position is used to determine the corresponding tile at the highest to lowest level of resolution. At 715, a first scaled area having the highest level of resolution for a particular area is selected. In the example shown in FIG. 8A, level 20 is the highest level of resolution. At 720, a determination is made as to whether the highest level tile found is present in the error radius data structure. If the tile selected has a 95% error radius, then the error radius for that tile is returned at 735; if not, then at 725, a determination is made as to whether not a next level of lower resolution is available. If so, the next level and resolution selected at 730 and the method returns to 720. If no additional tiles are available, the data structure may include a fall back error radius for the venue and the error radius associated with the fallback for the venue is returned at 740.

Figure 10:
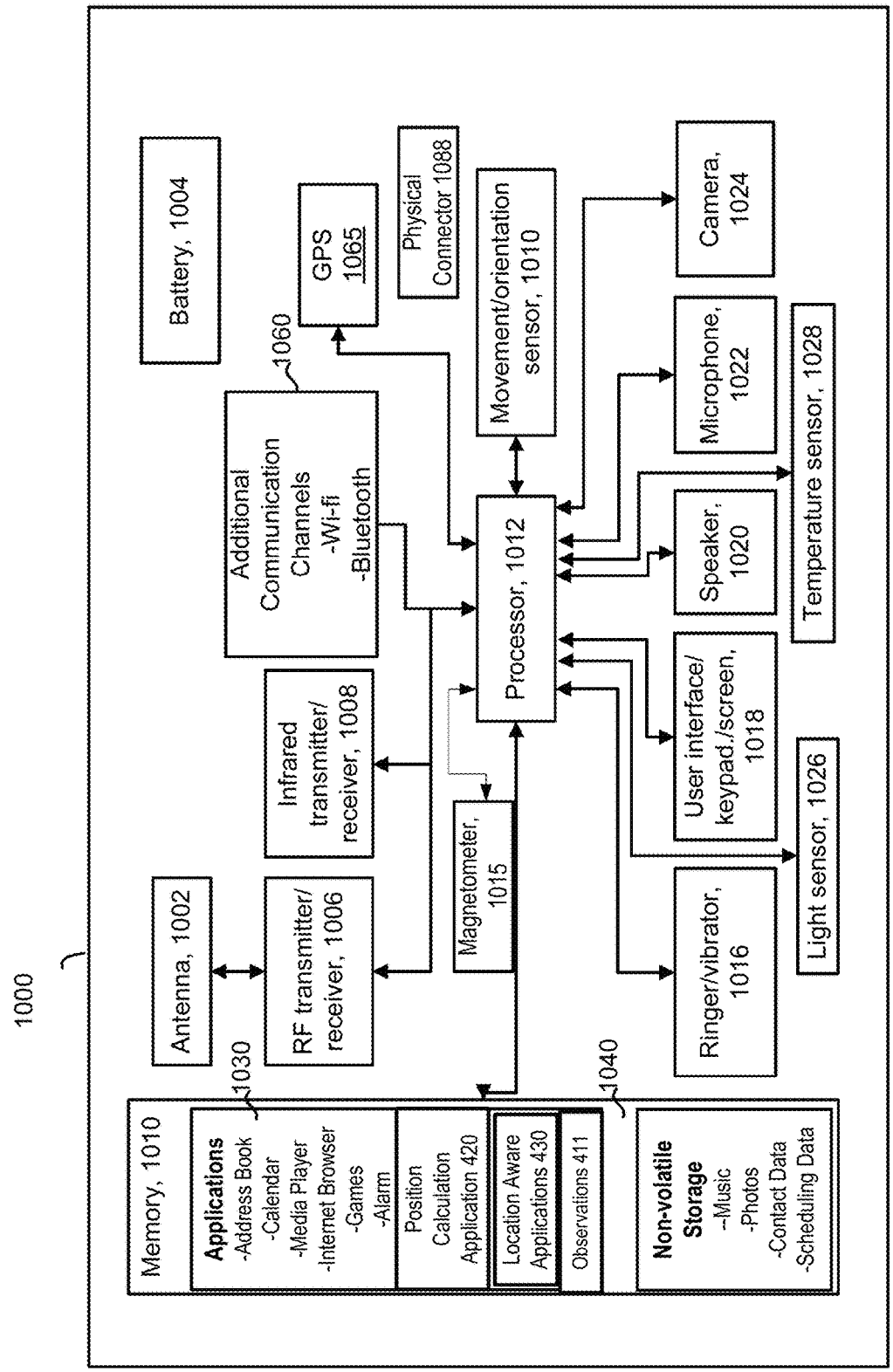
FIG. 10 is a block diagram of a processing system.

FIG. 10 depicts an example block diagram of a mobile device for implementing the operations of the disclosed technology. Exemplary electronic circuitry of a typical mobile phone is depicted. The mobile device 1400 includes one or more microprocessors 1412, and memory 1410 (e.g., non-volatile memory such as ROM and volatile memory such as RAM) which stores processor-readable code which is executed by one or more processors of the control processor 1412 to implement the functionality described herein.

Mobile device 1400 may include, for example, processors 1412, memory 1410 including applications and non-volatile storage. The processor 1412 can implement communications, as well any number of applications, including the applications discussed herein. Memory 1410 can be any variety of memory storage media types, including non-volatile and volatile memory. A device operating system handles the different operations of the mobile device 1400 and may contain user interfaces for operations, such as placing and receiving phone calls, text messaging, checking voicemail, and the like. The applications 1430 can be any assortment of programs, such as a camera application for photos and/or videos, an address book, a calendar application, a media player, an internet browser, games, an alarm application or other third party applications. The non-volatile storage component 1440 in memory 1410 contains data such as web caches, music, photos, contact data, scheduling data, and other files.

The processor 1412 also communicates with RF transmit/receive circuitry 1406 which in turn is coupled to an antenna 1402, with an infrared transmitted/receiver 1408, and with a movement/orientation sensor 1414 such as an accelerometer and a magnetometer 1415. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 1412 further communicates with a ringer/vibrator 1416, a user interface keypad/screen 1418, a speaker 1420, a microphone 1422, a camera 1424, a light sensor 1426 and a temperature sensor 1428. Magnetometers have been incorporated into mobile devices to enable such applications as a digital compass that measure the direction and magnitude of a magnetic field in the vicinity of the mobile device, track changes to the magnetic field and display the direction of the magnetic field to users.

The processor 1412 controls transmission and reception of wireless signals. During a transmission mode, the processor 1412 provides a voice signal from microphone 1422, or other data signal, to the transmit/receive circuitry 1406. The transmit/receive circuitry 1406 transmits the signal to a remote station (e.g., a fixed station, operator, other cellular phones, etc.) for communication through the antenna 1402. The ringer/vibrator 1416 is used to signal an incoming call, text message, calendar reminder, alarm clock reminder, or other notification to the user. During a receiving mode, the transmit/receive circuitry 1406 receives a voice or other data signal from a remote station through the antenna 1402. A received voice signal is provided to the speaker 1420 while other received data signals are also processed appropriately.

Additionally, a physical connector 1488 can be used to connect the mobile device 100 to an external power source, such as an AC adapter or powered docking station. The physical connector 1488 can also be used as a data connection to a computing device. The data connection allows for operations such as synchronizing mobile device data with the computing data on another device. A global positioning service (GPS) receiver 1465 utilizing satellite-based radio navigation to relay the position of the user applications is enabled for such service.

FIG. 10 depicts an example block diagram of a mobile device for implementing the operations of the disclosed technology. The device of FIG. 10 is a more detailed illustration of, for example, devices 102, 104 of FIG. 1. Exemplary electronic circuitry of a typical mobile processing device is depicted. The mobile device 1000 includes one or more microprocessors 1012, and memory 1010 (e.g., non-volatile memory such as ROM and volatile memory such as RAM) which stores processor-readable code which is executed by one or more processors of the control processor 1012 to implement the functionality described herein.

Mobile device 1000 may include, for example, processors 1012, memory 1010 including applications and non-volatile storage. The processor 1012 can implement communications, as well any number of applications, including the applications discussed herein. Memory 1010 can be any variety of memory storage media types, including non-volatile and volatile memory. A device operating system handles the different operations of the mobile device 1000 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an internet browser, games, an alarm application or other third party applications. The non-volatile storage component 1040 in memory 1010 contains data such as web caches, music, photos, contact data, scheduling data, and other files.

The processor 1012 also communicates with RF transmit/receive circuitry 1006 which in turn is coupled to an antenna 1002, with an infrared transmitted/receiver 1008, and with a movement/orientation sensor 1014 such as an accelerometer and a magnetometer 1015. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 1012 further communicates with a ringer/vibrator 1016, a user interface keypad/screen 1018, a speaker 1020, a microphone 1022, a camera 1024, a light sensor 1026 and a temperature sensor 1028. Magnetometers have been incorporated into mobile devices to enable such applications as a digital compass that measure the direction and magnitude of a magnetic field in the vicinity of the mobile device, track changes to the magnetic field and display the direction of the magnetic field to users.

The processor 1012 controls transmission and reception of wireless signals. During a transmission mode, the processor 1012 provides a voice signal from microphone 1022, or other data signal, to the transmit/receive circuitry 1006. The transmit/receive circuitry 1006 transmits the signal to a remote station (e.g., a fixed station, operator, other cellular phones, etc.) for communication through the antenna 1002. The ringer/vibrator 1016 is used to signal an incoming call, text message, calendar reminder, alarm clock reminder, or other notification to the user. During a receiving mode, the transmit/receive circuitry 1006 receives a voice or other data signal from a remote station through the antenna 1002. A received voice signal is provided to the speaker 1020 while other received data signals are also processed appropriately.

Additionally, a physical connector 1088 can be used to connect the mobile device 100 to an external power source, such as an AC adapter or powered docking station. The physical connector 1088 can also be used as a data connection to a computing device. The data connection allows for operations such as synchronizing mobile device data with the computing data on another device. A global positioning service (GPS) receiver 1065 utilizing satellite-based radio navigation to relay the position of the user applications is enabled for such service.

Figure 11:
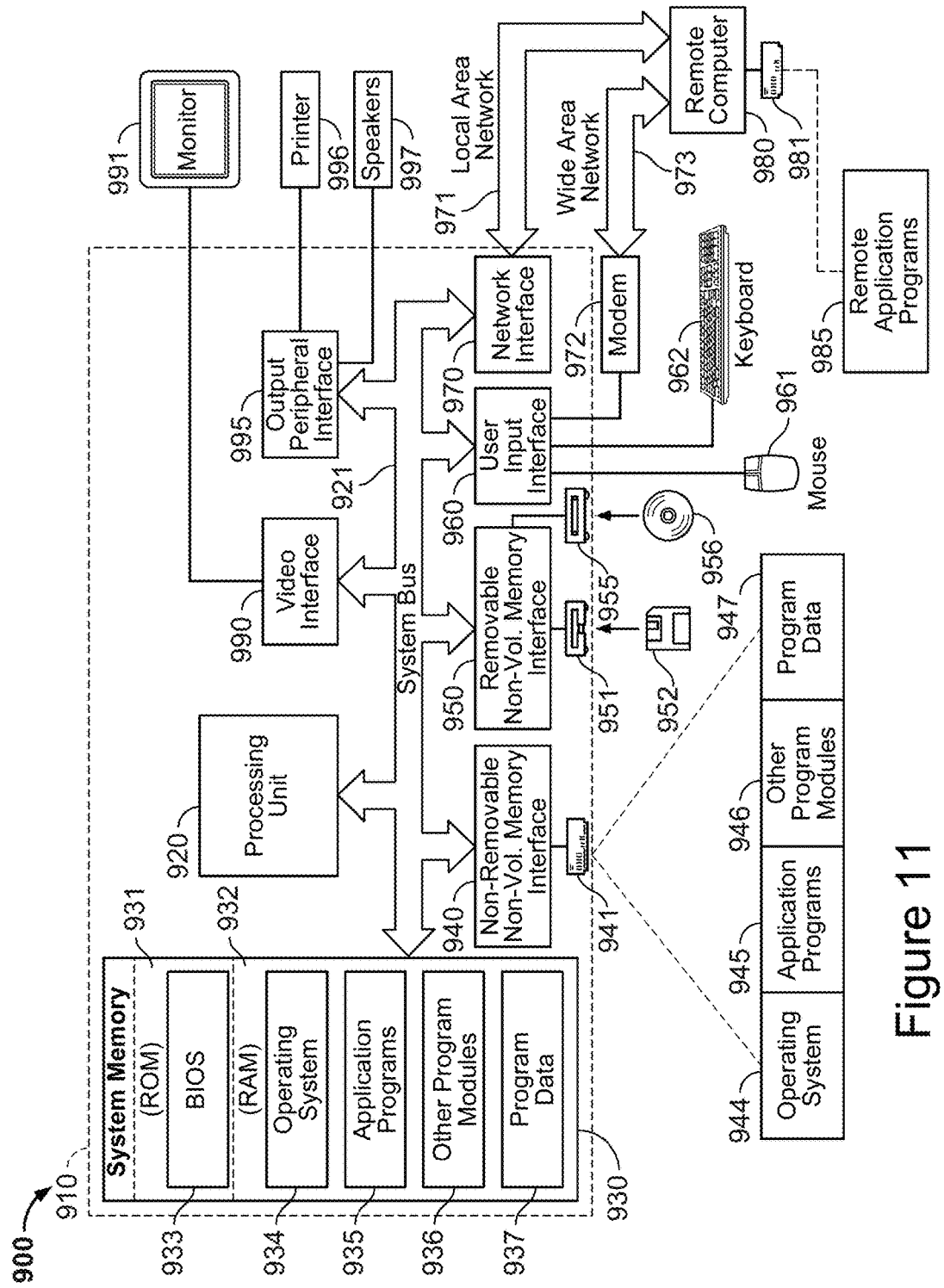
FIG. 11 is a block diagram of a second processing system.

FIG. 11 illustrates an example of a suitable computing system environment 900 such as personal computer on which the technology may be implemented. The computing system environment 900 is only one example of a suitable computing environment and is not intended to suggest any limitation as to the scope of use or functionality of the technology. Neither should the computing environment 900 be interpreted as having any dependency or requirement relating to any one or combination of components illustrated in the exemplary operating environment 900.

In one embodiment, the system of FIG. 9 or multiples thereof may be used to provide the location service 150.

Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage. Computer storage media includes both volatile and nonvolatile, removable and non-removable media for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 939.

The computer 910 may also include other tangible removable/non-removable, volatile/nonvolatile computer storage media. By way of example only, FIG. 9 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 949. Note that these components can either be the same as or different from operating system 934, application programs 935, other program modules 936, and program data 939. Operating system 944, application programs 945, other program modules 946, and program data 949 are given different numbers here to illustrate that, at a minimum, they are different copies. A user may enter commands and information into the computer 20 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 999 and printer 996, which may be connected through a output peripheral interface 990.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 991 and a wide area network (WAN) 993, but may also include other networks. Such networking environments are commonplace in offices, enterprise-wide computer networks, intranets and the Internet.

When used in a LAN networking environment, the computer 910 is connected to the LAN 991 through a network interface or adapter 990. When used in a WAN networking environment, the computer 910 typically includes a modem 992 or other means for establishing communications over the WAN 993, such as the Internet. The modem 992, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of determining an error radius for a calculated position of a mobile computing device, comprising:

creating, by the mobile computing device, a data structure including multiple levels of scaled geographic areas, different levels of the scaled geographic areas having different size scales, the data structure further including a plurality of first fields identifying a plurality of scaled geographic areas based on a global projection reference system, and a plurality of second fields identifying, for each of the first fields, a position error radius, each position error radius calculated to be a maximum error radius for at least a threshold percentage of inferred positions in an associated scaled geographic area;

determining, by the mobile computing device, a scaled geographic area from the data structure, the scaled geographic area associated with the calculated position of the mobile computing device;

returning, by the mobile computing device, a corresponding error radius from the data structure, the corresponding error radius mapped to the scaled geographic area associated with the calculated position of the mobile computing device; and utilizing, by a location-aware application on the mobile computing device, the corresponding error radius to provide information to a user of the mobile computing device;

wherein creating the data structure comprises:

gathering position survey information for a location venue for which limited global positioning system (GPS) data is available, the position survey information comprising beacon fingerprints of wireless beacons detected by an antenna of the mobile computing device at the location venue and known actual positions associated with the beacon fingerprints;

partitioning the position survey information into first and second data sets;

determining, for the multiple levels of the scaled geographic areas, first errors between a plurality of first inferred positions determined based on beacon fingerprints in the first data set and the known actual positions associated with said beacon fingerprints;

determining, for the multiple levels of the scaled geographic areas, second errors between a plurality of second inferred positions determined based on beacon fingerprints in the second data set and the known actual positions associated with said beacon fingerprints;

determining, for the multiple levels of the scaled geographic areas, a correlation between the first errors and the second errors;

selecting the scaled geographic areas for which the first errors and the second errors satisfy a correlation threshold; and including the selected scaled geographic areas and the position error radii in associated fields of the data structure.

2. The computer implemented method of claim 1 wherein said returning the corresponding error radius comprises:

determining whether the scaled geographic area in the global projection reference system including the calculated position is identified at a level in the data structure;

if the scaled geographic area in the global projection reference system is present at the level in the data structure, returning the corresponding error radius; and if the scaled geographic area in the global projection reference system is not present at the level in the data structure, returning the corresponding error radius from a search of a lower resolution scaled geographic area at another level including the calculated position.

3. The computer implemented method of claim 2 wherein if no lower resolution scaled geographic area including the calculated position is present in the data structure, returning a venue-level default as the corresponding error radius.

4. The computer implemented method of claim 1 wherein creating the data structure includes storing the data structure on the mobile computing device.

5. The computer implemented method of claim 1 wherein the mobile computing device is coupled to a remote computing device via a network, wherein returning the corresponding error radius comprises outputting the corresponding error radius to the remote computing device.

6. A non-transitory computer-readable medium comprising instructions that, when executed by a processor of a mobile computing device, cause the processor to perform functions comprising:

creating, by the processor, a data structure, the data structure including:

(a) a plurality of first data fields, each first data field containing data representing a position estimation error radius; and (b) a plurality of second data fields, each second data field representing a scaled geographic area in a global projection reference system divided into levels of varying size scaled geographic areas;

wherein each of the plurality of second data fields is mapped to one of the plurality of first data fields so that ones of the scaled geographic areas at a level are associated with an error radius which is calculated to include a true position relative to an inferred position for greater than a threshold percentage of inferred positions in the scaled geographic area; and wherein creating the data structure comprises:
gathering position survey information for a location venue for which limited global positioning system (GPS) data is available, the position survey information comprising beacon fingerprints of wireless beacons detected by an antenna of the mobile computing device at the location venue and known actual positions associated with the beacon fingerprints;
partitioning the position survey information into first and second data sets;
determining, for the multiple levels of the scaled geographic areas, first errors between a plurality of first inferred positions determined based on beacon fingerprints in the first data set and the known actual positions associated with said beacon fingerprints;
determining, for the multiple levels of the scaled geographic areas, second errors between a plurality of second inferred positions determined based on beacon fingerprints in the second data set and the known actual positions associated with said beacon fingerprints;
determining, for the multiple levels of the scaled geographic areas, a correlation between the first errors and the second errors;
selecting the scaled geographic areas for which the first errors and the second errors satisfy a correlation threshold; and
including the selected scaled geographic areas and the position estimation error radii in associated fields of the data structure;
determining, by the processor, a scaled geographic area from the data structure, the scaled geographic area associated with a calculated position of the mobile computing device;
returning, by the processor, a corresponding error radius from the data structure, the corresponding error radius mapped to the scaled geographic area associated with the calculated position of the mobile computing device; and
utilizing the corresponding error radius to provide information to a user of the mobile computing device.

7. The non-transitory computer-readable medium of claim 6, wherein the data structure further includes for each inferred position relative to a venue at least one venue-level default error radius.

8. The non-transitory computer-readable medium of claim 6, wherein the non-transitory computer-readable medium is provided in the mobile computing device and wherein each inferred position refers to a position of the mobile computing device.

9. A mobile computing device, comprising:
an antenna;
a processor;
a memory including a data structure having position estimation error radii, the position estimation error radii mapped to a global projection reference system divided into levels of varying scaled geographic areas, each error radius of the position estimation error radii in the data structure calculated to be accurate for greater than a threshold percentage of inferred positions to thereby more accurately infer a position of the mobile computing device; and code stored in the memory, the code instructing the processor to perform the steps of:
gathering position survey information for a location venue for which limited global positioning system (GPS) data is available, the position survey information comprising beacon fingerprints of wireless beacons detected by an antenna of the mobile computing device at the location venue and known actual positions associated with the beacon fingerprints;
partitioning the position survey information into first and second data sets;
determining, for the multiple levels of the scaled geographic areas, first errors between a plurality of first inferred positions determined based on beacon fingerprints in the first data set and the known actual positions associated with said beacon fingerprints;
determining, for the multiple levels of the scaled geographic areas, second errors between a plurality of second inferred positions determined based on beacon fingerprints in the second data set and the known actual positions associated with said beacon fingerprints;
selecting the scaled geographic areas for which the first errors and the second errors satisfy a correlation threshold;
including the selected scaled geographic areas in the data structure;
calculating an inferred position for the mobile computing device;
determining, using the data structure, a scaled geographic area associated with the inferred position;
returning, from the data structure, a corresponding error radius mapped to the scaled geographic area associated with the inferred position; and
utilizing the corresponding error radius to provide information to a user of the mobile computing device.

10. The mobile computing device of claim 9, wherein returning the corresponding error radius includes:
determining whether the scaled geographic area in the global projection reference system including the inferred position is identified at a level in the data structure;
if the scaled geographic area in the global projection reference system is present at the level in the data structure, returning the corresponding error radius; and
if the scaled geographic area in the global projection reference system is not present at the level in the data structure, returning the corresponding error radius from a search of a lower resolution scaled geographic area at another level including the inferred position.

11. The mobile computing device of claim 10 wherein if no lower resolution scaled geographic area including the inferred position is present in the data structure, returning a venue-level default as the corresponding error radius.

12. The mobile computing device of claim 10 wherein the data structure includes further for each inferred position relative to a venue at least one venue-level default error radius.

13. A computer implemented method of determining an error radius for a calculated position, the computer implemented method being implemented by a mobile computing device, the computer implemented method comprising:
creating, by the mobile computing device, a data structure including multiple levels of scaled geographic areas, different levels of the scaled geographic areas having different size scales, the data structure further including a plurality of first fields identifying a plurality of scaled geographic areas based on a global projection reference system, and a plurality of second fields identifying, for each of the first fields, a position error radius, each position error radius calculated to be a maximum error radius for at least a threshold percentage of inferred positions in an associated scaled geographic area;

determining, by the mobile computing device, a scaled geographic area from the data structure, the scaled geographic area associated with the calculated position of the mobile computing device;

returning, by the mobile computing device, a corresponding error radius from the data structure, the corresponding error radius mapped to the scaled geographic area associated with the calculated position of the mobile computing device; and utilizing, by a location-aware application on the mobile computing device, the corresponding error radius to provide information to a user of the mobile computing device;

wherein creating the data structure comprises:

gathering position survey information for a location venue for which limited global positioning system (GPS) data is available, the position survey information comprising beacon fingerprints of wireless beacons detected by an antenna of the mobile computing device at the location venue and known actual positions associated with the beacon fingerprints;

partitioning the position survey information into first and second data sets;

determining, for the multiple levels of the scaled geographic areas, first errors between a plurality of first inferred positions determined based on beacon fingerprints in the first data set and the known actual positions associated with said beacon fingerprints;

determining, for the multiple levels of the scaled geographic areas, second errors between a plurality of second inferred positions determined based on beacon fingerprints in the second data set and the known actual positions associated with said beacon fingerprints;

determining, for the multiple levels of the scaled geographic areas, a correlation between the first errors and the second errors;

selecting the scaled geographic areas for which the first errors and the second errors satisfy a correlation threshold; and including the selected scaled geographic areas and the position error radii in associated fields of the data structure; and wherein returning the corresponding error radius comprises:

determining whether the scaled geographic area in the global projection reference system including the calculated position of the mobile computing device is identified at a level in the data structure;

if the scaled geographic area in the global projection reference system is present at the level in the data structure, returning the corresponding error radius; and if the scaled geographic area in the global projection reference system is not present at the level in the data structure, returning the corresponding error radius from a search of a lower resolution scaled geographic area at another level including the calculated position of the mobile computing device.

14. The computer implemented method of claim 13 wherein if no lower resolution scaled geographic area including the calculated position is present in the data structure, returning a venue-level default as the corresponding error radius.

* * * * *